United States Patent [19]
Dalbec et al.

[11] Patent Number: 5,961,044
[45] Date of Patent: Oct. 5, 1999

[54] MISTING APPARATUS AND METHOD

[75] Inventors: James Dalbec, Las Vegas, Nev.; Nick Paschke, Platteville, Wis.

[73] Assignee: Rite-Hite Holding Corporation, Milwaukee, Wis.

[21] Appl. No.: 08/903,574

[22] Filed: Jul. 31, 1997

[51] Int. Cl.[6] .................................................. B05B 9/06
[52] U.S. Cl. ........................... 239/77; 239/121; 239/418; 239/432
[58] Field of Search ............................... 231/77, 78, 121, 231/120, 418, 432

[56] References Cited

U.S. PATENT DOCUMENTS

| | | | |
|---|---|---|---|
| 3,472,454 | 10/1969 | Blue et al. | 239/77 |
| 3,670,963 | 6/1972 | Stroebel et al. | 239/77 |
| 3,804,332 | 4/1974 | Welsah | 239/77 |
| 4,927,080 | 5/1990 | Alsing | 239/77 |
| 5,098,018 | 3/1992 | Hadar et al. | 239/77 |
| 5,176,322 | 1/1993 | Sartor | 239/77 |
| 5,285,818 | 2/1994 | Hummert | 138/107 |
| 5,383,599 | 1/1995 | Zur | 239/77 |
| 5,497,633 | 3/1996 | Jones et al. | 62/314 |

FOREIGN PATENT DOCUMENTS

| | | | |
|---|---|---|---|
| 1235653 | 3/1967 | Germany | 239/77 |
| 2163671 | 3/1986 | United Kingdom . | |

*Primary Examiner*—Kevin Weldon

[57] ABSTRACT

A misting system is provided which includes a source of forced air and an air conduit for conveying the forced air that is operably connected to the source of forced air and which includes at least one air opening to allow the forced air to escape the conduit. The mist is provided from a source of dispersant and the system also includes a dispersant conduit for conveying the dispersant from the source. This conduit in turn includes at least one dispersant opening for dispersing the dispersant in the form of a mist. The at least one dispersant opening is disposed adjacent the at least one air opening so that the mist exiting from the dispersant opening is entrained in the forced air escaping the conduit to assist in its further dispersion and mixing with the air.

11 Claims, 9 Drawing Sheets

MISTING APPARATUS AND METHOD

FIELD OF THE INVENTION

The invention is directed generally to misting systems, and particularly to such a system employing the technique of deploying the water or other dispersant to be dispersed adjacent an airflow.

BACKGROUND OF THE INVENTION

In hot environments, and particularly those where the air is also dry, it is often desirable to add mist or water droplets to the air in order to cool the air in a controlled area. This cooling affect is provided by the mist evaporating into the air. The energy required for evaporation is provided by the heat of the ambient air, resulting in cooler air by so called "evaporative cooling." The process of evaporative cooling is improved by further inducing a movement of air over the mist droplets. An induced airflow conveys and mixes the mist with ambient air thus increasing the volume of air that is subject to evaporative cooling.

As a secondary benefit, the moisture which is not completely evaporated in the air may contact the skin of the people in the area. Evaporative cooling will draw heat from the person's body, resulting in further cooling, which a movement of air will also enhance.

Figure 1:
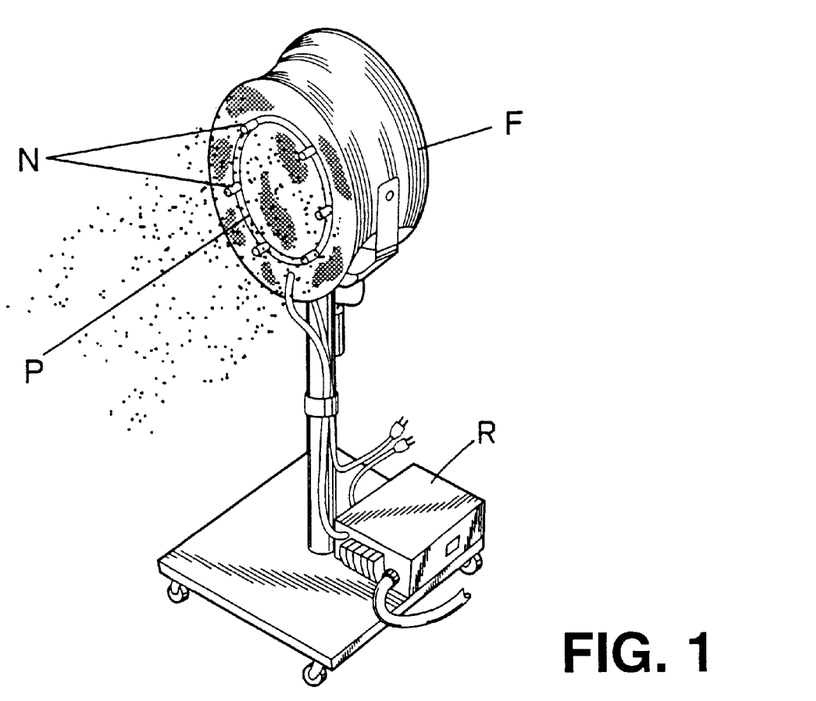
FIG. 1 is a perspective view of a prior art misting system.
Figure 2:
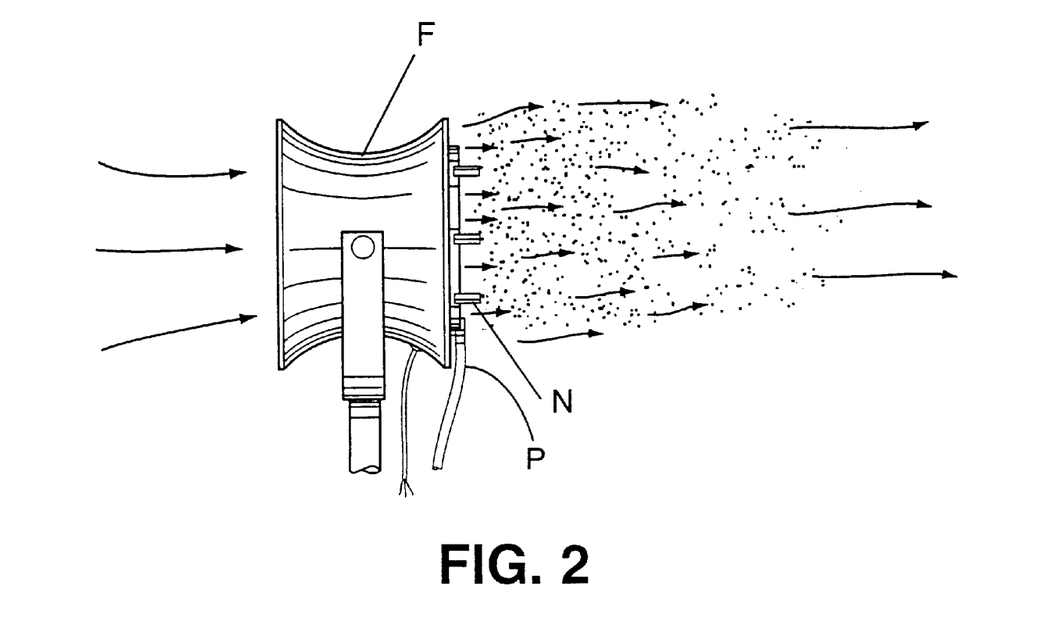
FIG. 2 is a side elevation of the misting system of FIG. 1.

Accordingly, misting systems are known which both provide mist and which have a source of forced air. The forced air is apparently intended not only to convey and disperse the water droplets, but also to provide air movement to enhance the evaporative cooling effect. One such misting system, combining simple mist generation and forced air, is shown in FIGS. 1 and 2. In that system, a high-power fan F is provided. A piping system P for water is disposed on the face of the fan F, and includes nozzles N. The piping system P is also connected to a water reservoir and pump R. Water is pumped from the reservoir R through the piping system P and to the nozzles N, from which it is atomized. The atomized water, represented as droplets in FIGS. 1 and 2 is thus dispersed into the airflow generated by the fan F, represented by arrows. The misted air is thus conveyed into the adjacent area, providing not only mist, but also air movement to enhance evaporative cooling. However, the effective area of such a system may be limited. Further, the concentration of atomized water is high adjacent the fan F, but drops off with increasing distance from the fan.

In another existing system, a conduit in the form of a fabric tube is coupled to a source of forced air, and includes periodic openings to allow the forced air to escape. Mist is then sprayed inside the tube adjacent the source of forced air. The misted air is intended to be conveyed along the tube, and escape from the spaced openings. While this does occur on a limited basis, the water tends to condense inside of the tube, and to concentrate in the tube adjacent the place where the mist is introduced.

SUMMARY OF THE INVENTION

Accordingly, it is an object of the invention to provide a misting system with improved features as compared to prior systems.

Without intending to limit the scope of the invention by referring to such improved features, they may include: increasing the effective area that may be serviced by such a system; controlling the size and/or shape of the area being serviced; improving the uniformity of the concentration of atomized water or other dispersant; and providing a simple, inexpensive system for generating and conveying mist in a controlled manner.

As will be apparent from review of the following detailed description of a preferred embodiment of the invention, a number of other objects and advantages are realized by the present device and method.

In accordance with such objects and advantages, there is provided a misting system that includes a source of forced air, a conduit for conveying the forced air, a source of water or other dispersant, and a conduit for conveying the dispersant. Both the air conduit and the dispersant conduit include openings. The openings in the air conduit allow the forced air to escape and generate an airflow. Similarly, the openings in the dispersant conduit allow the dispersant to escape and generate mist. The two types of openings are disposed adjacent to each other such that the mist is dispersed into the airflow and conveyed away from the air conduit. This not only gives an even, uniform distribution of misted dispersant, but also provides a distributed airflow to enhance evaporative cooling.

According to the preferred embodiment of this invention, the air conduit is a fabric tube including at least one vent in the form of a section of mesh extending longitudinally along the fabric tube. The dispersant conduit is in the form of tubing which also extends longitudinally along the fabric tube, and which has periodically-spaced openings or nozzles. The nozzles are disposed adjacent the vents so that the mist emanating from the nozzles becomes entrained in the airflow escaping from the vent. Preferably, the tubing is disposed in a pocket adjacent the vent, either on the inside or on the outside of the fabric tube. In either event, however, the nozzles are disposed exterior to the tube. As a result, an even distribution and concentration of mist is disposed into the airflow along the length of the tube.

This novel structure also represents one embodiment of a structure that carries out the novel method according to a further aspect of the invention. According to that method, air is forced through a conduit including an air opening for allowing the air to escape and generate an airflow. Dispersant is also conveyed through a conduit to a dispersant opening disposed adjacent the air opening in the air conduit. The dispersant is then dispersed through the dispersant opening such that the dispersant is entrained in the airflow. Again, an even distribution and concentration of water mist or other dispersant is disposed into the airflow adjacent the air conduit.

A variety of features and advantages, as well as sub-features and other novel structure will be apparent from review of the following detailed description of a preferred embodiment or mode of the inventive apparatus and method. In that written description, reference will be made to the attached drawings, wherein:

DETAILED DESCRIPTION OF THE PREFERRED EMBODIMENTS

While the invention will be described in connection with certain preferred embodiments, there is no intent to limit it to those embodiments. On the contrary, the intent is to cover all alternatives, modifications and equivalents as are included within the scope and spirit of the invention as defined by the appended claims.

Figure 3:
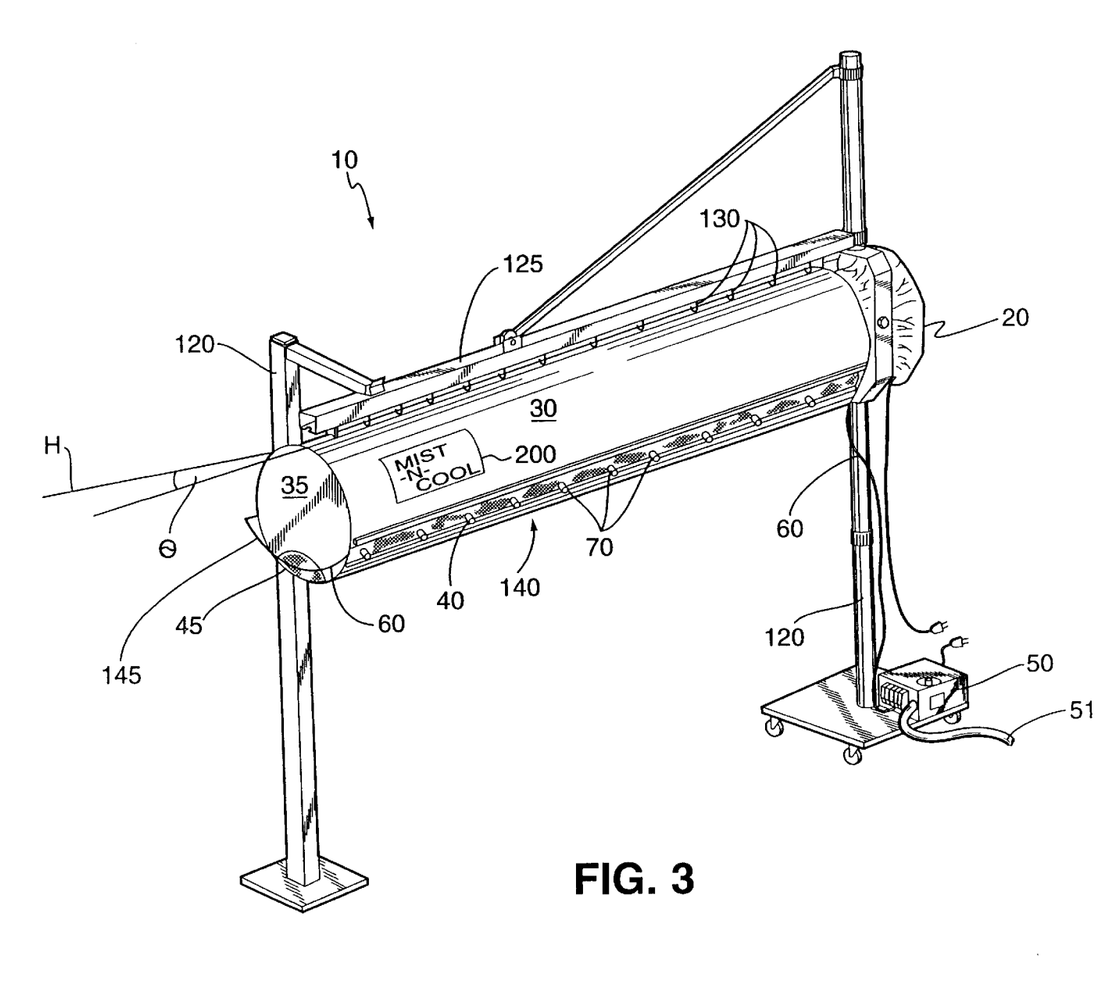
FIG. 3 is a perspective view of a misting system according to a preferred embodiment of the invention.

A misting system 10 according to the invention is shown in FIG. 3. The system includes a source of forced air, illustratively in the form of a fan 20, such as the fan shown in the prior art device of FIGS. 1 and 2. Preferably, the fan is a model manufactured by FanTech, Inc. of 3224 Meade Avenue, Las Vegas, Nev. 89102 under model number FTFT22, although other fans or air-handling units, blowers, etc could also serve as the source of forced air. Further, although the fan has been shown on a wheeled support, stationary fans or other air handling units could be used. In addition to the fan 20, the system also includes a conduit for conveying the forced air. In the present embodiment, the conduit is in the form of a fabric tube 30 that is operably connected to the fan 20. The fabric tube 30 includes air dispersing openings, which in this embodiment are in the form of vents 40. The vents 40 are sections of mesh fabric which extend longitudinally along the fabric tube 30, at approximately 4 and 8 o'clock positions (only one such vent 40 is seen in the view of FIG. 3). An additional opening or vent 45 may be provided in the endcap 35 of the fabric tube 30, as described in greater detail below. The fabric tube is preferably similar to so-called "high throw" DUCTSOX® fabric air dispersion systems manufactured and sold by the Frommelt Safety Division of Rite-Hite Corporation in Dubuque, Iowa. These fabric ducts are formed of woven polyethylene, preferably that supplied by Intertape Polymer Group, under model number NOVA-THENE FR-212W, which fabric is characterized by an 11 mil thickness, and a weight of 5.6 oz per square yard. These fabric ducts include spaced holes for allowing the air to escape once they are inflated. While such spaced holes could be used in the system of the invention, the preferred form of the openings in the air conduit is the longitudinal vents 40 as shown in FIG. 3. It should also be noted that while a fabric conduit is preferred, conventional metal or rigid ductwork could also be used.

The fan 20 and fabric tube 30, along with vents 40, generate an airflow by virtue of forced air escaping from the vents 40. According to the invention, the system disperses water mist or other dispersants by mist into this airflow. To provide for this, the system 10 also includes a source of mist or dispersant and a conduit for conveying and dispersing the dispersant. While water is the preferred dispersant for the system 10, other types of dispersants could be used. For example, the system could be used to disperse pesticides or fertilizers in a greenhouse environment, and is not limited to so-called "evaporative cooling" installations. Alternatively, the system could disperse a smoke-like dispersant for special effects. The term "mist" is meant to generically refer to an atomized liquid to be dispersed by the system according to the invention, but gas or powder could also be dispersed in such a mist. Further, "dispersant" is referred to herein generically as the medium that is intended to be dispersed by the system according to the invention. In this embodiment, the source of dispersant is in the form of a pump 50 which is connected to a water source by a hose 51. A dispersant conduit, which in the present embodiment is a water conduit 60, is connected to the pump 50. The water conduit 60 includes openings, illustratively in the form of nozzles 70, disposed along the conduit, and which disperse or atomize the water escaping therefrom. According to the invention, the dispersing openings or nozzles are disposed adjacent the vents 40 and preferably external to the fabric tube 30 so that the atomized water or dispersant emanating from the nozzles 70 is entrained in the airflow generated by the air escaping from the vents 40. In this way, mist generated by the nozzles 70 is uniformly distributed along the length of the fabric tube and conveyed away from the tube into the surrounding air. A cross-sectional view showing this effect is depicted in FIG. 6, showing the mist as droplets D, and airflow as arrows A.

In the present embodiment, the nozzles 70 are disposed adjacent to the air openings or vents 40 by virtue of the water conduit 60 being disposed in a pocket 80 adjacent the vent 40, as seen most clearly in FIG. 5. As can be seen there, the vent 40 is in the form of a section of mesh 41 sewn along the length of the fabric tube 30. An additional pocket of mesh 81 is sewn over the vent mesh 41 to form a pocket 80 for receiving the water conduit 60. Spaced along the mesh pocket 81 are holes 82, which are spaced to match the spacing of the nozzles 70 along the water conduit 60. The nozzles 70 thus extend through these holes and are clear of the mesh material 81. This arrangement is seen even more clearly in the section view of FIG. 8.

As a further feature of the invention, advertising, ownership, or other visual indicia 200 could be attached on or printed directly on the air conduit, illustratively a fabric tube 30, as shown in FIG. 3.

Alternative arrangements of the water conduit 60, pocket 80 and vents 40 are seen in FIGS. 9–11. In each case the "A" drawing shows a partial section, while the "B" drawing shows a partial elevation. FIG. 9 shows a pocket 80' having a slightly different shape and sew pattern than the pocket 80 of FIG. 8. In FIG. 10, the pocket 80" is shown disposed interior to the fabric tube 30, but with the nozzle 70" still disposed exterior to the tube 30. In the preferred embodiment of this invention, the dispersant opening or nozzle is disposed exterior to the air conveying conduit to prevent the buildup of excess and unnecessary moisture inside of the air conduit. Finally, in the alternative embodiment of FIG. 11, the water conduit 60 is simply suspended from the fabric tube 30 by a series of straps 80'".

All of the embodiments just described share the common features of providing a conduit for conveying air and including openings for allowing the escape of air and generating an airflow. Also included is a source of dispersant, and a conduit for conveying the dispersant which also includes openings for dispersing the dispersant. These dispersant openings are disposed adjacent to the air openings such that the atomized dispersant emanating from the dispersant openings is entrained in the airflow generated by the openings in the air conduit. Mist is thus uniformly dispersed from the air conduit along its entire length. It will be appreciated by one of skill in the art that a variety of other structures besides those specifically disclosed herein would provide these common features and thus fall within the scope of the invention. Further, the orientation of the structure could also be modified. For example, the conduit could be disposed vertically instead of horizontally. The dispersant conduit could similarly extend radially around the air conduit (preferably with similar radial air openings in the conduit) instead of extending longitudinally.

Figure 7:
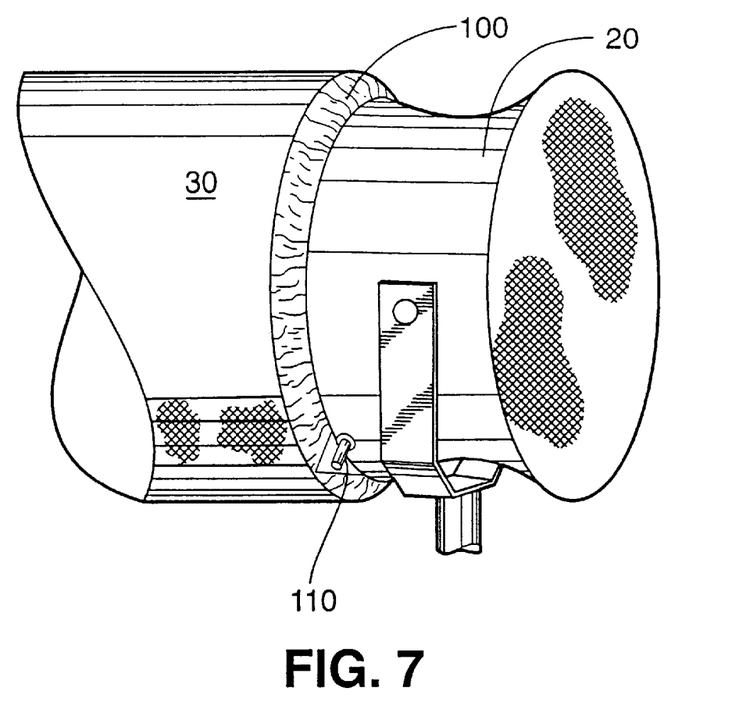
FIG. 7 is a partial perspective of the misting system of FIG. 3.
Figure 8:
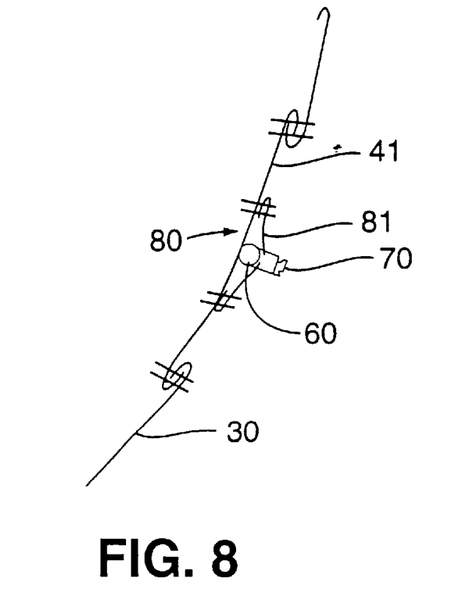
FIG. 8 is a partial section of the misting system of FIG. 3.
Figure 9A:
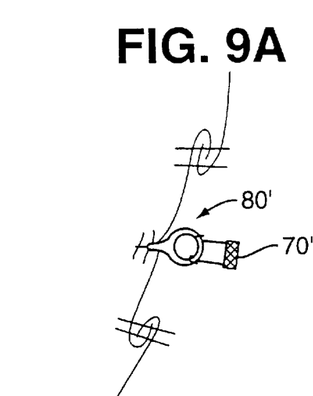
FIGS. 9A and 9B are partial sections and partial elevations, respectively, of an alternative arrangement of components in the misting system of FIG. 3.
Figures 9B, 10B:
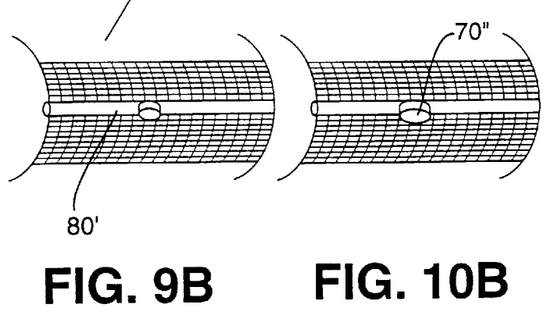
FIGS. 10A and 10B are partial sections and partial elevations, respectively, of a further alternative arrangement of components in the misting system of FIG. 3.
Figure 10A:
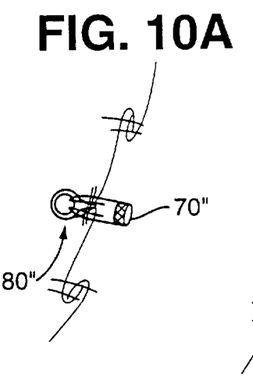
Figure 11A:
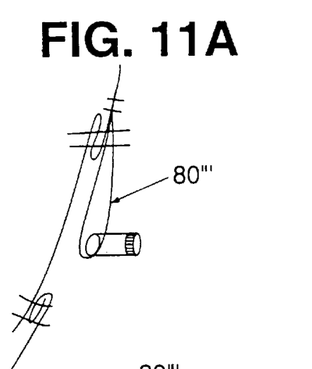
FIGS. 11A and 11B are partial sections and partial elevations, respectively, of a still further alternative arrangement of components in the misting system of FIG. 3.
Figure 11B:
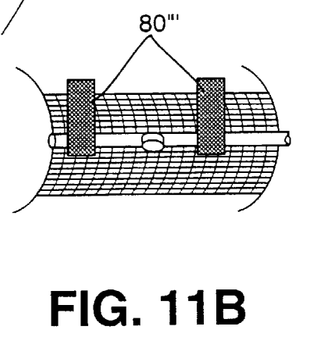

Since the preferred air conduit according to this embodiment of the invention is a fabric tube 30, it can be operably connected to the source of forced air or fan 20 by virtue of a simple cinch connection as shown in FIG. 7. A sleeve 100 is sewn to one end of the tube 30, and a cinch rope 110 is disposed inside, that can be pulled taut around the body of the fan 20. It will be appreciated, however, that other means for operatively connecting the fan 20 and the fabric tube 30 are possible. For instance, a section of conduit or a baffle may be disposed between the fan and the fabric tube. Alternatively, a different source of forced air may be used such as a blower or other air-handling unit. Further, other conduits such as conventional rigid conduits may be used. In either case, there must simply be a operable connection such that the forced air enters and in is conveyed by the conduit.

Figure 4:
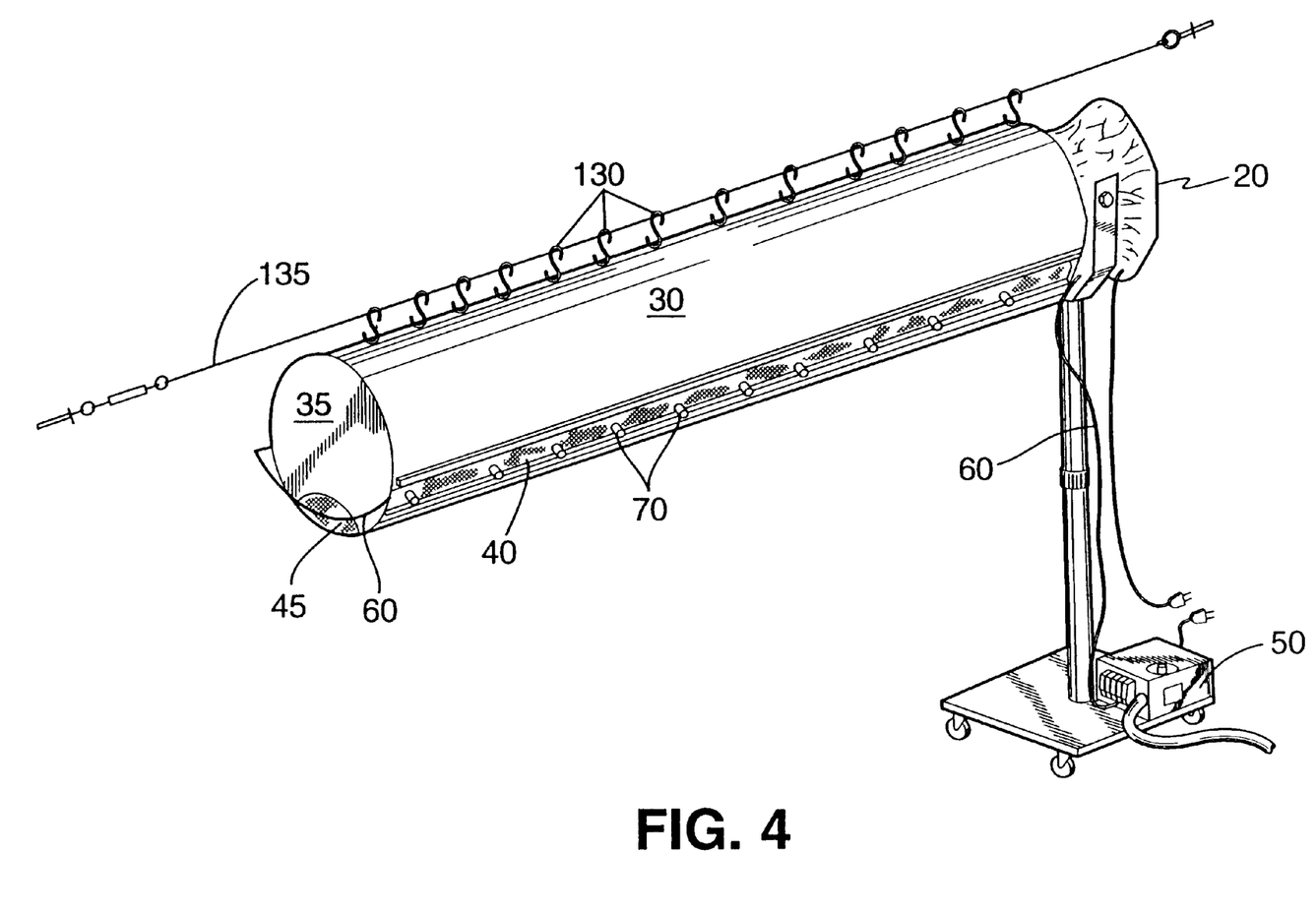
FIG. 4 is a perspective view showing an alternative embodiment of the invention.
Figure 5:
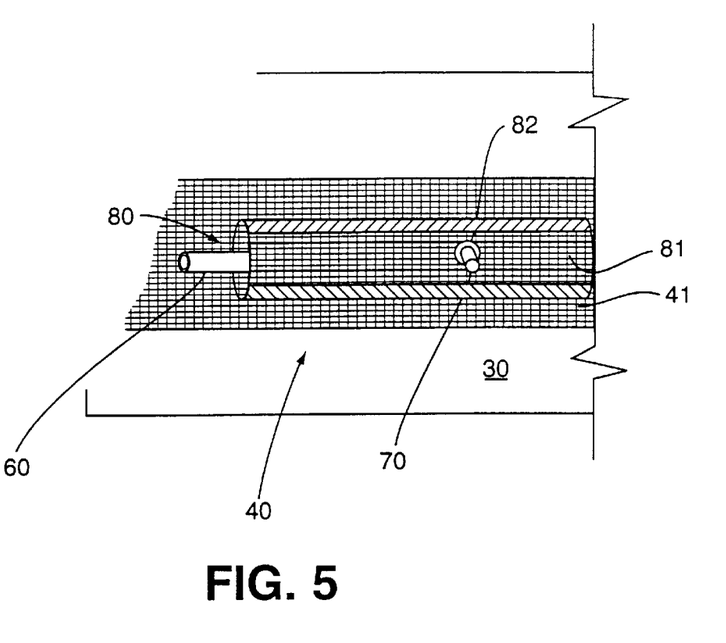
FIG. 5 is a partial elevation of the misting system of FIG. 3.
Figure 6:
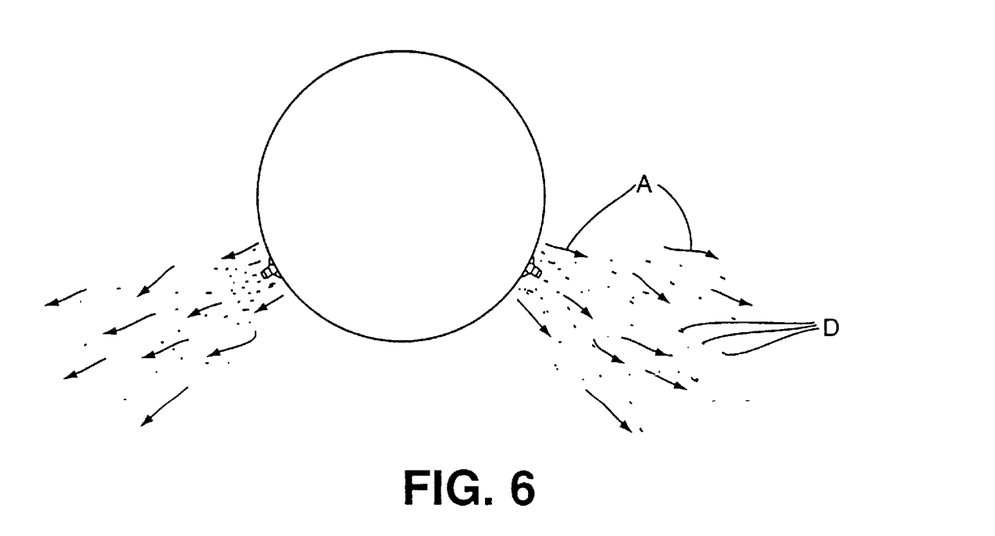
FIG. 6 is a section view of the misting system of FIG. 3.
Figure 12:
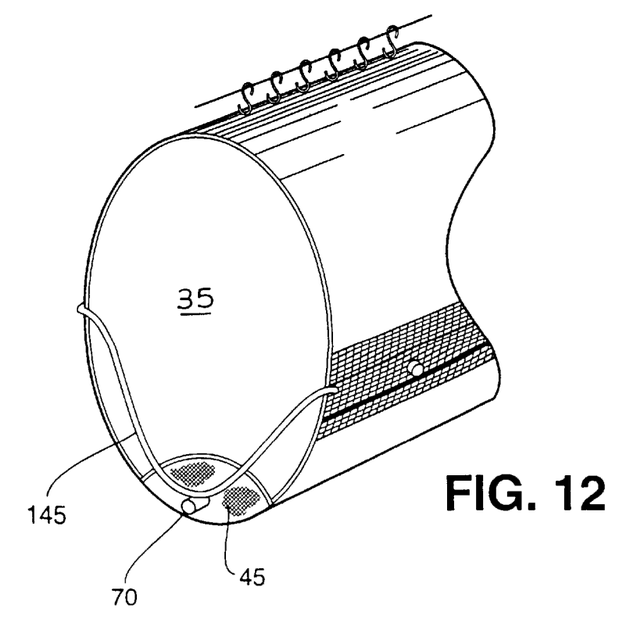
FIG. 12 is a partial perspective showing an endcap for the misting system of FIG. 3.

The use of a fabric tube 30 as the air conduit according to the invention allows a simple and inexpensive installation of the conduit. Given its light weight, the fabric tube can be easily suspended from a support system. In FIG. 3, the support system is in the form of stands 120 connecting a support rod 125. A series of hooks 130 are suspended from the support rod and attach to the top of the fabric tube, such as by engaging a grommetted flap extending along the length of the tube (see FIG. 12). Given the light weight and collapsibility of the fabric tube, the system can be made easily portable. Alternatively, the tube can be more permanently installed by being suspended from a cable 135 connected to the ceiling of a warehouse or other facility, as shown in FIG. 4.

According to the preferred embodiment disclosed herein, the water conduit 60 is stainless steel tubing with brass connectors and nozzles. The conduit is generally u-shaped, as seen most clearly in FIG. 3, with two runs 140 (only one of which is seen in FIG. 3) running longitudinally along the fabric tube 30, and connected by a cross piece 145 extending across the endcap 35 of the tube, which includes a vent 45. The cross piece 145 preferably also includes a nozzle 70 disposed adjacent the vent 45. While rigid tubing has been used for conveying the dispersant, it will be appreciated that a variety of other tubing materials, including flexible ones, could be used. Use of flexible tubing would enhance the portability of the system. Further, other dispersing opening besides nozzles may be used, including simple pinhole openings.

Figure 13:
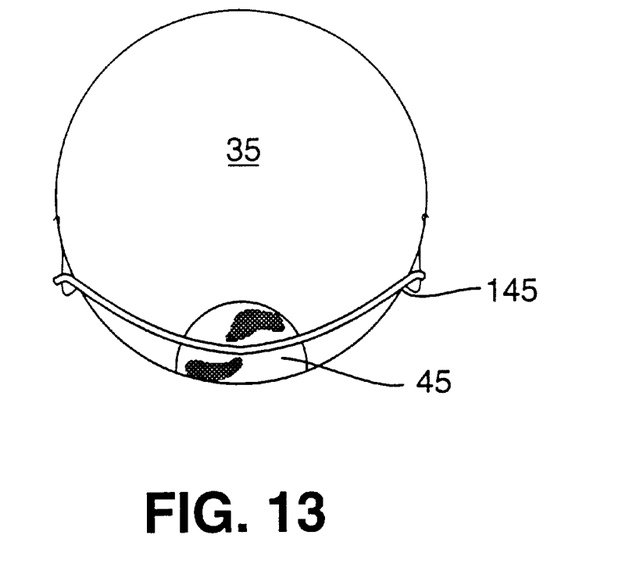
FIG. 13 is an elevation showing the endcap of FIG. 12.
Figure 14:
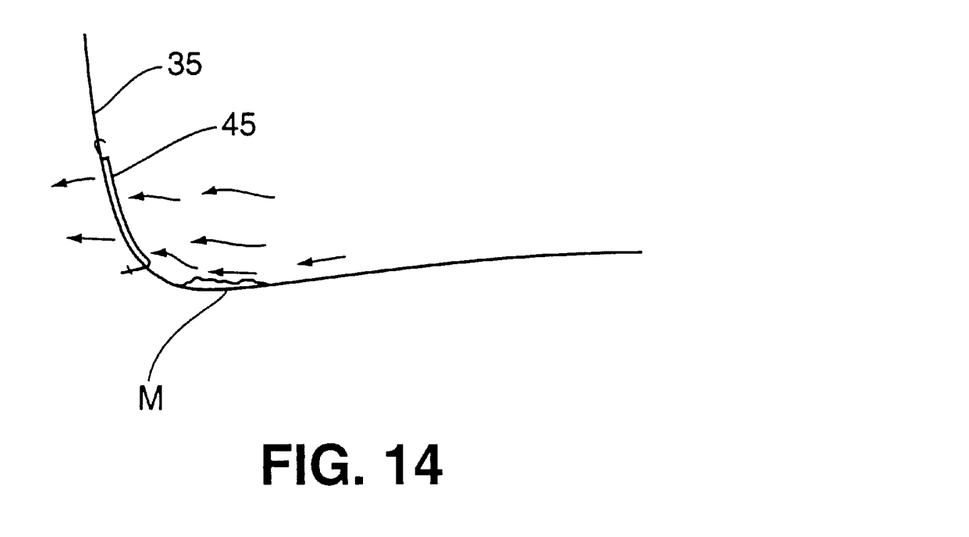
FIG. 14 is a partial section shown adjacent the endcap of FIG. 12.

The vent 45 formed in endcap 35 not only allows for the mist or dispersant to become entrained in the airflow escaping therefrom, but may also provide additional advantageous function. In the present embodiment, the vent 45 has been formed in the bottom of the endcap 35, as seen in the elevation view of FIG. 13. This location has been chosen to enhance removal of the accumulation of any undesired condensation inside the tube 30. The tube 30 may be advantageously angled slightly downward, as represented by $\theta$ in FIG. 3 (about 5° from the horizontal "H") toward the endcap end. In the unlikely event that any condensation forms within the tube, it would thus tend to collect adjacent the vent 45. Given that air is flowing out the vent 45, it will pass over the accumulated moisture M, as seen in FIG. 14. This will assist in evaporating the moisture M and removing it from the tube 30. Given that the water conduits according to the invention are preferably disposed outside of the tube 30, the chances for such moisture accumulation are small, but any such accumulation could be dealt with by the endcap vent 45.

Figure 15:
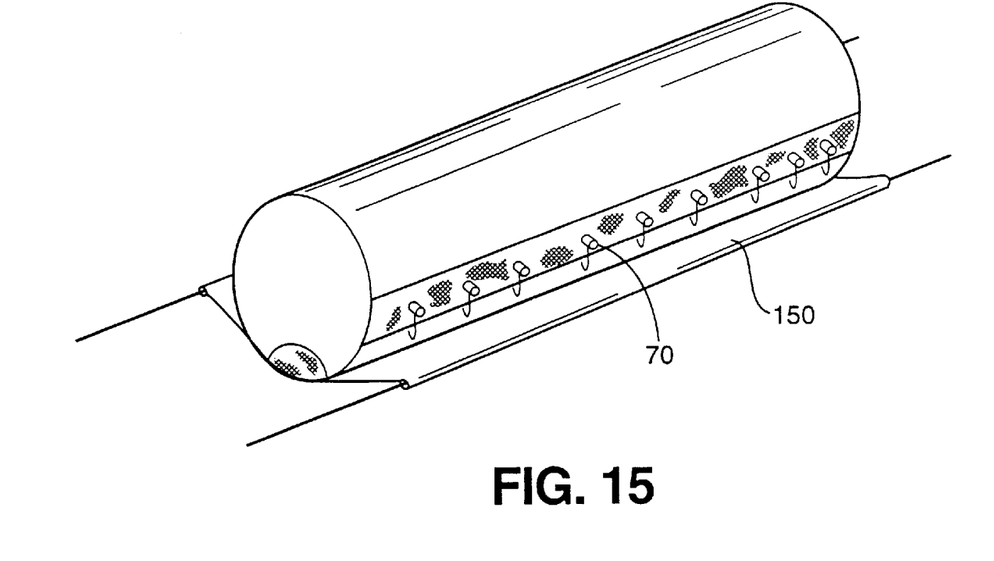
FIG. 15 is an elevation showing a trough system for use with the misting system of FIG. 3.
Figure 16:
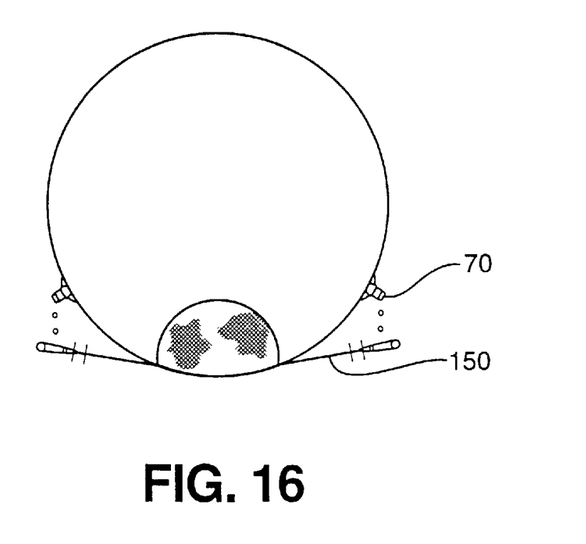
FIG. 16 is an elevation showing the trough of FIG. 15.
Figure 17:
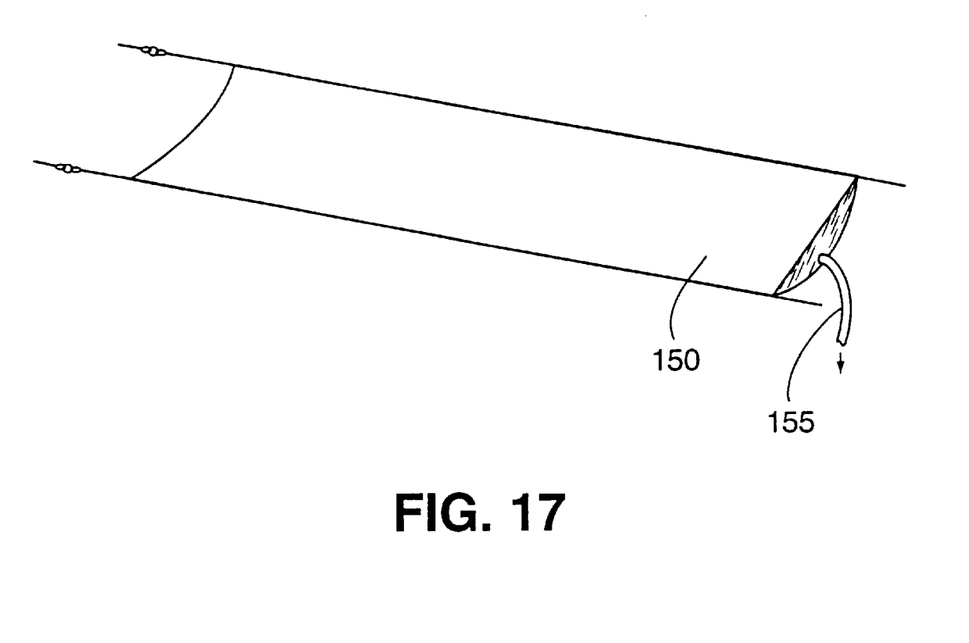
FIG. 17 is a component drawing showing the trough of FIG. 15.

In the event the misting system according to the invention is used in manufacturing or storage facilities where liquid water is undesirable, a troughing system like that show in FIGS. 15–17 may be employed. Such a system ensures that a faulty nozzle 70 will not generate a drip of liquid water. Instead, such a drip of liquid water would instead be caught by the trough 150 disposed along the length of the air conduit, as seen in FIGS. 15 and 16. The air conduit could be angled slightly from the horizontal to provide for conveying of the water along the trough 150 by gravity. Further, the trough 150 may include a drain 155 as seen in FIG. 17 from which the runoff water could be collected.

There has thus been disclosed a misting system and method in which a dispersant is dispersed adjacent an airflow from an air conduit coupled to a source of forced air. This results in the mist being entrained in the airflow and carried away from the conduit in an evenly distributed manner. Further, given that the dispersant is dispersed from spaced openings in the conduit conveying the dispersant, mist does not concentrate in a particular area, but rather is evenly distributed along the length of the air conduit, thus increasing the effective area that may be serviced by such a system as compared to prior art systems. Further, if fabric tubing is used for the air conduit, the system may be made portable and/or simple and inexpensive to install and maintain.

What is claimed is:

1. A misting system, comprising in combination: a source of forced air; a fabric tube for conveying the forced air that is operably connected to the source of forced air and which includes at least one air opening in the form of a fabric mesh section of the fabric tube which extends longitudinally along the fabric tube to allow the forced air to escape the tube; a source of dispersant; and a dispersant conduit for conveying the dispersant from the source and which includes at least one dispersant opening for dispersing the dispersant in the form of a mist, the at least one dispersant opening being disposed adjacent the at least one air opening.

2. The misting system of claim 1, wherein the at least one dispersant opening is disposed external to the tube.

3. The misting system of claim 1, wherein the dispersant conduit is rigid tubing, and the dispersing opening are nozzles.

4. The misting system of claim 3, wherein the nozzles are disposed external to the fabric tube.

5. The misting system of claim 1, and including portable support members from which the fabric tube is suspended.

6. The misting system of claim 1, wherein the fabric tube includes an endcap opposite the source of forced air, the endcap including an air opening.

7. The misting system of claim 1, including a visual indicia disposed on the fabric tube.

8. A misting system, comprising in combination: a source of forced air; a fabric tube for conveying the forced air that is operably connected to the source of forced air and which includes at least one air opening to allow the forced air to escape the tube; a source of dispersant; a dispersant conduit for conveying the dispersant from the source and which includes at least one dispersant opening for dispersing the dispersant in the form of a mist, the at least one dispersant opening being disposed adjacent the at least one air opening; and a fabric pocket connected to the fabric tube for receiving the dispersant conduit.

9. The misting system of claim 8, wherein the fabric pocket is disposed external to the to the fabric tube.

10. A misting system, comprising in combination: a source of forced air: an air conduit for conveying the forced air that is operably connected to the source of forced air and which includes at least one air opening to allow the forced air to escape the conduit and which also includes an endcap opposite the source of forced air, the endcap including an air opening; a source of dispersant; a dispersant conduit for conveying the dispersant from the source and which includes at least one dispersant opening for dispersing the dispersant in the form of a mist, the at least one dispersant opening being disposed adjacent the at least one air opening and wherein the air conduit is disposed at an angle from the horizontal toward the endcap, such that dispersant accumulates in the conduit adjacent the endcap and the air opening therein to enhance evaporation.

11. A misting system, comprising in combination: a source of forced air; an air conduit for conveying the forced air that is operably connected to the source of forced air and which includes at least one air opening to allow the forced air to escape the conduit; a source of dispersant; a dispersant conduit for conveying the dispersant from the source and which includes at least one dispersant opening for dispersing the dispersant in the form of a mist, the at least one dispersant opening being disposed adjacent the at least one air opening; and a trough disposed external to the air conduit for accumulating dispersant dripping from the dispersant openings.

* * * * *